(12) United States Patent
Scheurich

(10) Patent No.: US 6,628,645 B2
(45) Date of Patent: *Sep. 30, 2003

(54) METHOD AND DEVICE FOR DETERMINING A SIGNALING ADDRESS OF A MOBILE SERVICES SWITCHING CENTER IN A CELLULAR COMMUNICATION SYSTEM

(75) Inventor: Jan Scheurich, Aachen (DE)

(73) Assignee: Telefonaktiebolaget LM Ericsson(PUBL), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/464,837

(22) Filed: Dec. 16, 1999

(65) Prior Publication Data

US 2003/0109262 A1 Jun. 12, 2003

(30) Foreign Application Priority Data

Dec. 17, 1998 (EP) ............................................. 98123948

(51) Int. Cl.⁷ ............................................. H04L 12/66
(52) U.S. Cl. ..................... 370/353; 370/352; 455/448; 455/560
(58) Field of Search ................................ 370/352, 353, 370/401, 409, 338, 354, 355; 379/221.14, 221.15; 455/422, 426, 432, 433, 435, 444, 448, 466, 560

(56) References Cited

U.S. PATENT DOCUMENTS 6,081,723 A * 6/2000 Mademann ................ 455/456
6,259,923 B1 * 7/2001 Lim et al. .................. 455/456

FOREIGN PATENT DOCUMENTS

DE 196 11 947 6/1997

OTHER PUBLICATIONS

European Search Report, dated Feb. 7, 2000.

Mademann, Frank, *General Packet Radio Service—a Packet Mode Service within the GSM*, publication date Apr. 23, 1995, ISS Symposium, Apr. 1995, vol. 1, pp. 36–40.

Rothlübbers, C., European Search Report on European Patent Application No. EP98123948.6, Jun. 2, 1999, pp. 1–3.

* cited by examiner

Primary Examiner—William Trost
Assistant Examiner—James D Ewart
(74) Attorney, Agent, or Firm—Jenkens & Gilchrist, P.C.

(57) ABSTRACT

Method and device for determining a signaling address of a mobile services switching center in a cellular communication system offering both circuit switched and packet switched services are disclose. The method is based on that, instead of using information on the location of a terminal equipment, information on the equipment of the system being used for reaching a terminal equipment is used for determining the mobile services switching center, in the service area of which the terminal equipment is located. The signaling address is determined on the basis of the knowledge of such information. For this purpose, for instance, allocation tables or sorting trees are used, which allocate the sought for signaling address to one or more equipment or to an information identifying one or more equipment.

16 Claims, 4 Drawing Sheets

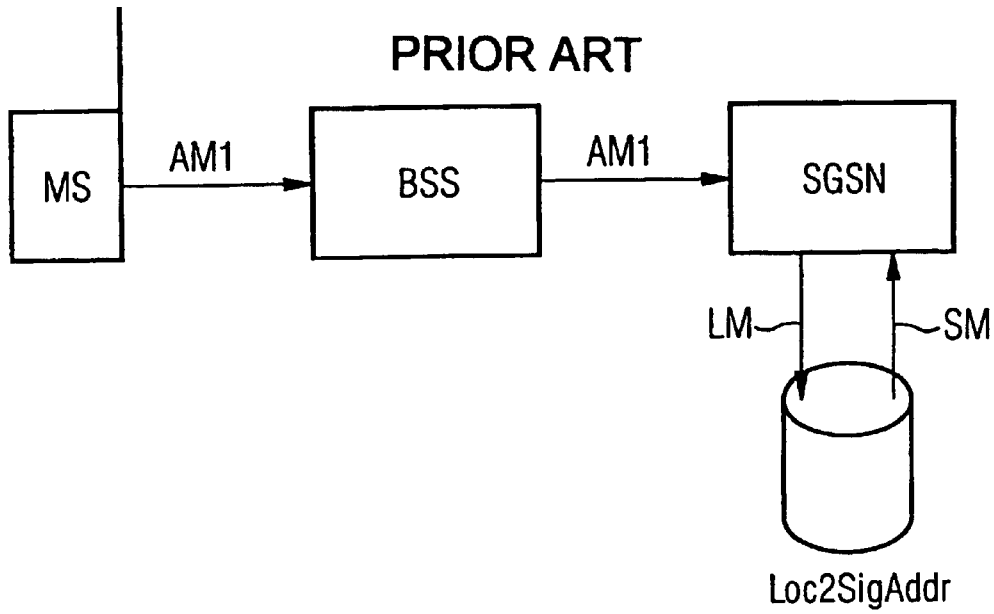
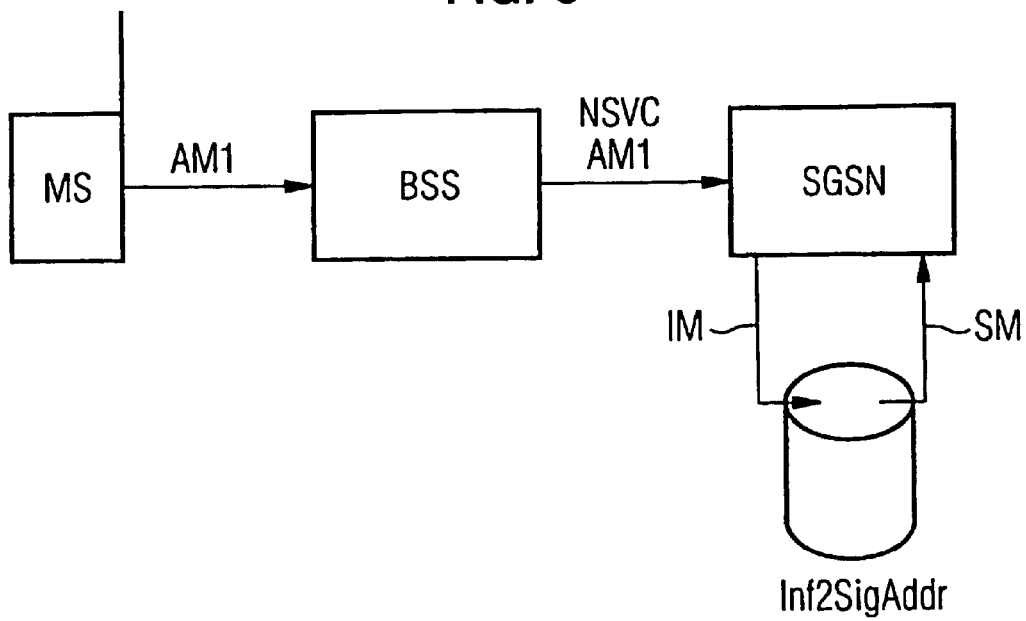

METHOD AND DEVICE FOR DETERMINING A SIGNALING ADDRESS OF A MOBILE SERVICES SWITCHING CENTER IN A CELLULAR COMMUNICATION SYSTEM

BACKGROUND

The invention relates to a method and a device for determining a signaling address of a mobile services switching center in a cellular communication system offering both circuit switched and packet switched services. In particular, the invention relates to the combination GPRS (General Packet Radio Service) in GSM (Global Standard for Mobile Communication). A further embodiment relates to a system offering UMTS (Universal Mobile Telecommunication System).

TECHNICAL FIELD OF THE INVENTION

The prior art discloses cellular communication systems offering both circuit switched and packet switched services. Thus, GSM TS 03.60 V6.1.0 GPRS Service Description, stage 2 describes the conversion of the packet switched GPRS in the circuit switched GSM.

In a cellular communication system offering both circuit switched and packet switched services, the communication with terminal equipment is carried out by the mobile services switching centers of one of both services, hereinafter called administrating service, for instance, for location updating or for attachment with the network. For location updating, a terminal equipment applies with the new mobile services switching center of the administering service and delivers first terminal equipment data. Said mobile services switching center subsequently initiates the location updating in the home location register, hereinafter called HLR in accordance with the mentioned standard. The HLR informs the preceding mobile services switching center of the administering service about the change of location and delivers additional terminal equipment data to the new mobile services switching center of the administering service.

Upon the termination of this procedure, the new mobile services switching center of the administering service contacts the new mobile services switching center of the respective other service and informs it about the change of location of the terminal equipment.

For this contact is it necessary that the signaling address of a mobile services switching center of the respective other service to be informed is known to the transmitting mobile services switching center of the administering service.

The information required for determining the signaling address of the mobile services switching center to be informed are obtained by using the terminal equipment data. According to prior art, the administering mobile services switching center detects the signaling address of the mobile services switching center to be informed from information on the location of the terminal equipment.

An information on the location can, for instance, refer to the location area or routing area in which the terminal equipment is located. A location area is a special unit covering an area of the circuit switched service, which comprises one or more cells, and which is serviced by one or more base station subsystems, but only by one mobile services switching center. A mobile services switching center can service several location areas. A routing area is a special unit covering an area of the packet switched service, which comprises one or more cells, and which is serviced by one or more base station subsystems, but only by one mobile services switching center. A mobile services switching center can service several routing areas. FIGS. 1a and 1b illustrate this connection by showing a section of a structure of a communication network, which services an area subdivided into the location areas LA1, LA2, LA3 and the routing areas RA1, RA2, RA3, RA4, respectively. FIG. 1a shows the structure of a circuit switched service. A mobile services switching center MSC1 thereby services four base station subsystems BSS11, BSS12, BSS13, BSS14. Two of the base station subsystems BSS11 and BSS12 service the location area LA1, the base station subsystem BSS13 services the location area LA2 and the base station subsystem BSS14 services the location area LA3.

Analogously thereto, FIG. 1b shows the structure of a packet switched service. The mobile services switching center SGSN services four base station subsystems BSS11, BSS12, BSS13, BSS14. The base station subsystem BSS11 services the routing area RA1, base station subsystem BSS12 services the routing area RA4, base station subsystem BSS13 services the routing area RA2 and base station subsystem BSS14 services the routing area RA3. Base station subsystems BSS11 to BSS 14 of the circuit switched service are identical with those of the packet switched service. Said base station subsystems are commonly used by both services.

The mobile services switching center of the administering service determines from information on the location of a terminal equipment the signaling address of the mobile services switching center of the other service to be informed, which is called location based approach.

In case of the above-mentioned GSM and GPRS services offering cellular communication systems, it is known from prior art that a mobile services switching center offering the GPRS service (hereinafter called GPRS service node) carries out the updating of location data of a terminal equipment and transmits said data to a mobile services switching center offering the GSM service. It is moreover known from prior art that a GPRS service node obtains the signaling address of a mobile services switching center by using information on the routing area (designated routing area information in the above-mentioned standard GSM TS 03.60 V6.1.0 GPRS Service Description, stage 2) by means of a location based allocation table.

FIG. 2 shows in a simplified manner the application process of a terminal equipment up to the determination of the signaling address of a mobile services switching center to be informed. A terminal equipment MS sends one or more messages to a mobile services switching center SGSN of the packet switched service via a base station subsystem BSS. A message AM1 containing location information on the terminal equipment MS is thereby transmitted by the base station subsystem BSS in a transparent, this means in an unchanged manner, to the mobile services switching center SGSN. The mobile services switching center SGSN determines, by using the location information, the signaling address of a mobile services switching center of the circuit switched service to be informed. A location based allocation table Loc2SigAddr delivers, upon an inquiry LM, the sought for signaling address in a response SM. The location information on the terminal equipment MS is contained in the inquiry LM.

In respect of determining a signaling address by means of a location data based approach it is a disadvantage that a change in the allocation of locations to the equipment makes a change in a location based allocation table for determining signaling addresses inevitable. Said changes increase costs in the administration of the communication system.

SUMMARY OF THE INVENTION

Accordingly, it is an object of the invention to develop a method and a device, which determines the signaling address of a mobile services switching center to be informed more effectively and in a more inexpensive manner.

The method described determines the signaling address from the information as to which equipment is used on the transmission path for reaching said terminal equipment, a so-called equipment based approach. The allocation of the signaling address thus is effected on the basis of data, which remain unchanged during a change of the location areas or routing areas. Thus, an equipment based allocation table has to be updated less frequently than in the case of a location based one, which results in that the costs for the above-mentioned changes as well as the administration expenses for the allocation table are reduced.

Further advantageous embodiments can be inferred from claims 2 to 7 and 9 to 12.

An embodiment of the invention, signaling address is implemented in a mobile services switching center, offers the advantage that few devices are required.

For reducing the setting-up expenses and the administration expenses of an equipment based allocation table, it proves advantageous to implement the allocation by means of the identification of an equipment, which is the highest one in a system hierarchy, which is commonly used by both the circuit switched and the packet switched service. In this way, an allocation table with as few as possible elements can be established.

BRIEF DESCRIPTION OF THE DRAWINGS

In the following, the invention is explained in more detail by means of an embodiment and figures.

FIG. 2 shows the attachment of a terminal equipment up to the determination of the signaling address during the location based approach, FIG. 3 shows the attachment of a terminal equipment up to the determination of the signaling address by means of a mobile services switching center during the device based method.

DETAILED DESCRIPTION OF EXEMPLARY PREFERRED EMBODIMENTS

Figure 5:
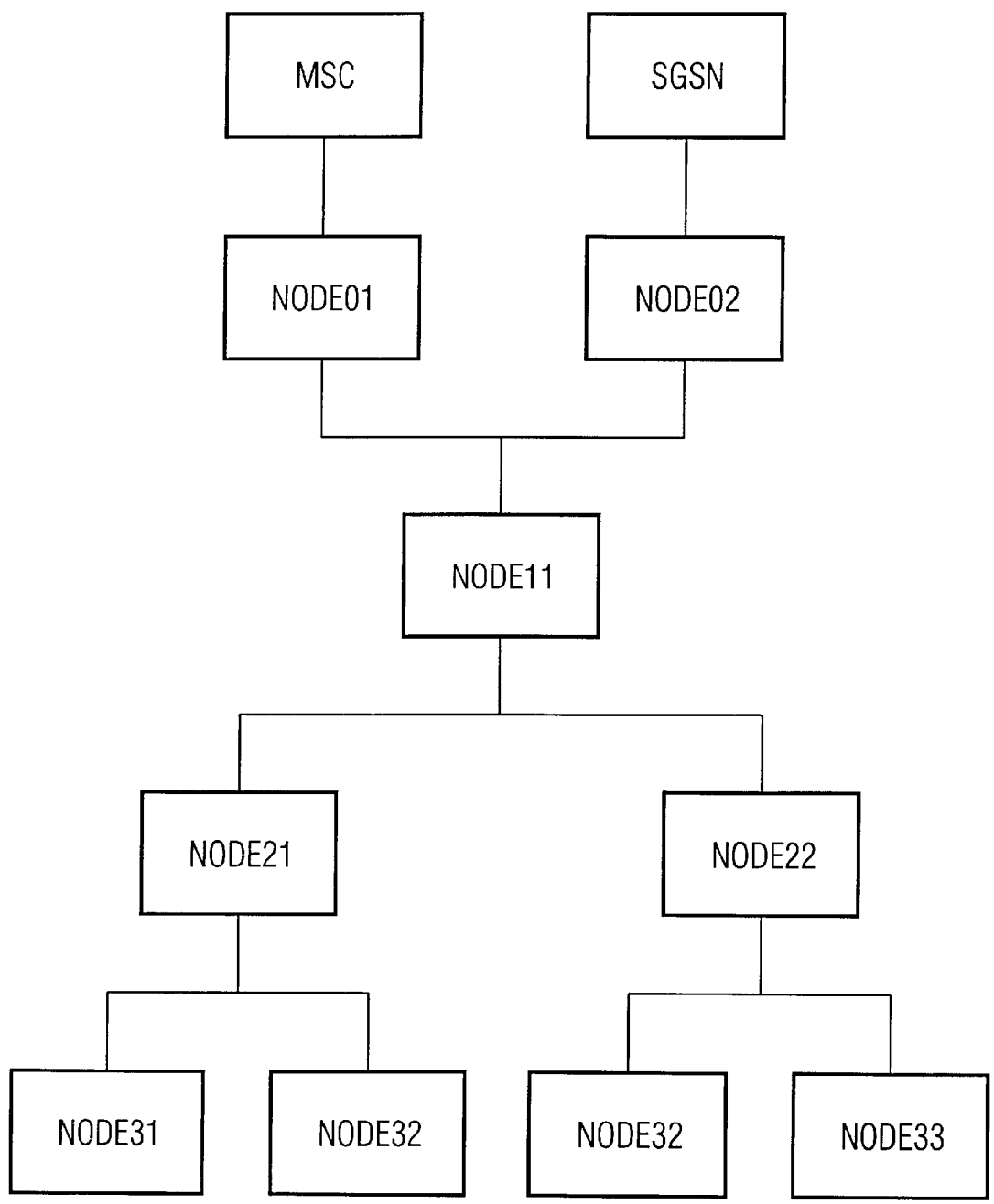
FIG. 5 shows the hierarchy of a communication system offering both a circuit switched and a packet switched service.

In the case of a device based approach, at least one device used commonly by both services for reaching the terminal equipment is identified. As each commonly used device is exactly allocated to a mobile services switching center per service, the signaling address of the mobile services switching center can be obtained from the knowledge of the device, for instance, by means of a device based allocation table. Said allocation table can, for instance, be located in a GPRS service node. In order to keep the allocation table as small as possible, it is useful to identify a device out of that category, which is the highest one in the system hierarchy commonly used by the circuit switched and the packet switched services for servicing a terminal equipment. FIG. 5 illustrates as to what is to be understood by a device commonly used by the packet switched and circuit switched services and being highest in the system hierarchy. FIG. 5 hereby illustrates a section of a cellular communication system for mobile users, which offers both circuit switched and packet switched services. Said section includes a mobile services switching center MSC of the circuit switched service as well as a mobile services switching center SGSN of the packet switched service. Additionally shown are several service nodes NODE01, NODE02, NODE11, NODE21, NODE22, NODE31, NODE32 and NODE33, the functionality of which has not been specified in more detail. Service node NODE01 is, for instance, a node of the circuit switched service, service node NODE02 is a node of the packet switched service. Service nodes NODE 11 to NODE33 are commonly used by both services, wherein service node NODE11 is the highest one in the system hierarchy commonly used by both the packet switched and the circuit switched services. Said equipment can be a base station subsystem or a radio network controller. Mobile services switching centers as defined by this application refer to service nodes of the above-mentioned communication system, which deal with communication tasks and which adjust communication traffic data stored by them during location updating.

Figure 1A:
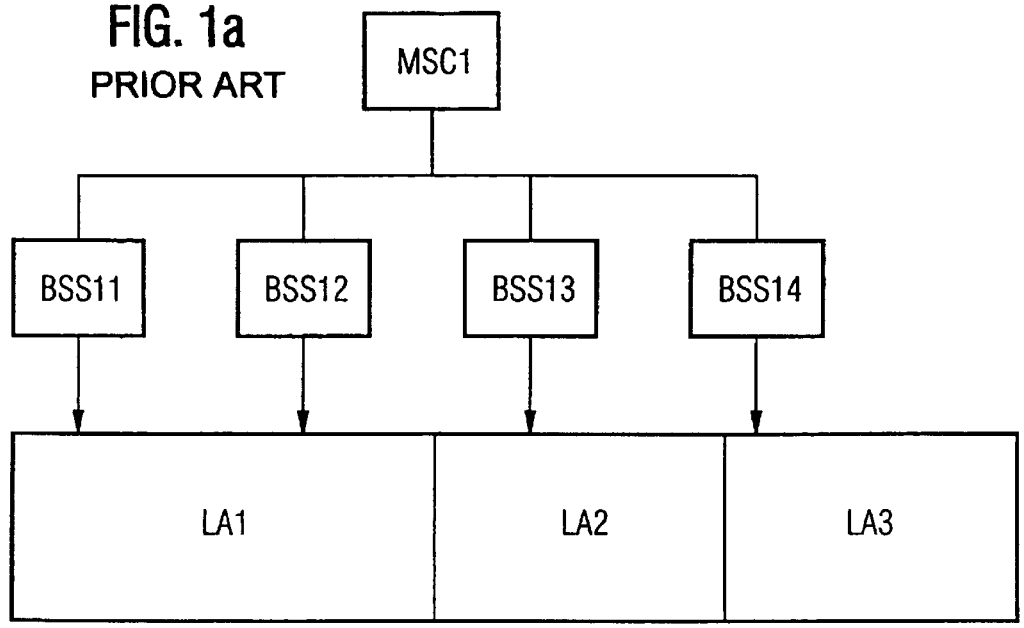
FIG. 1a shows the arrangement of a cellular circuit switched communication system for a certain area divided into the location areas LA1 to LA3.
Figure 1B:
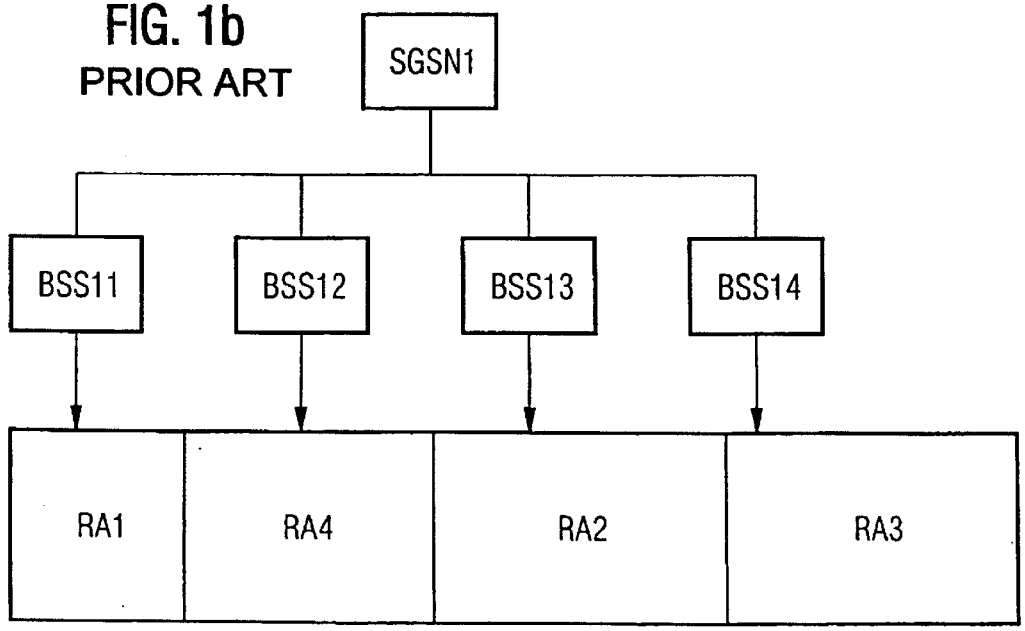
FIG. 1b: shows the arrangement of a cellular packet switched communication system for the same area divided into the routing areas RA1 to RA4.
Figure 4:
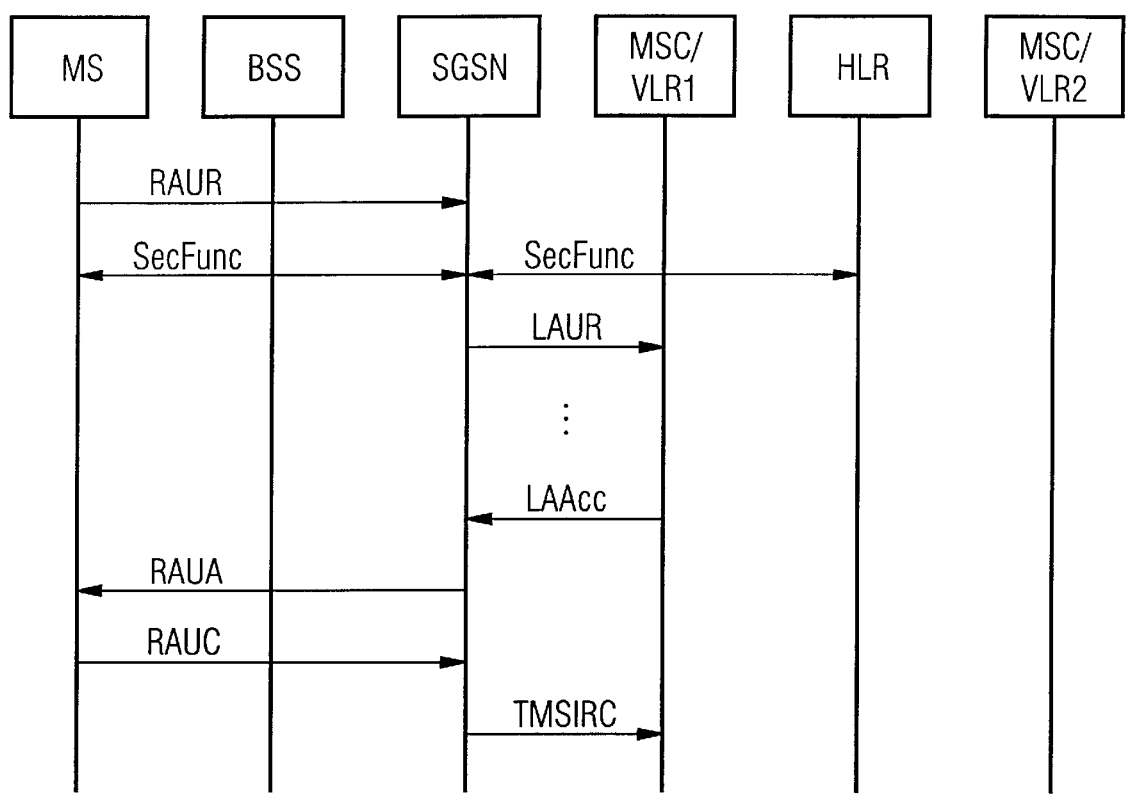
FIG. 4 shows the location updating for routing area and location area.

In the case of the above-mentioned introduction of GPRS in GSM in view of a common location area and routing area update, the process is as follows, as is shown by FIG. 4.

In a first step, a terminal equipment MS attaches via a base station subsystem BSS with a GPRS service node SGSN by sending a routing area update request RAUR. The base station subsystem BSS forwards said routing area update request RAUR via a frame relay channel reserved therefor. By using said channel, the base station subsystem BSS is exactly identified. Several Sec Func Message for security functions are thereupon exchanged between the terminal equipment MS, the GPRS service node SGSN and the home location register HLR. The GPRS service node SGSN subsequently determines, from the information as to which base station subsystem is used on the transmission path, the signaling address of a mobile services switching center to be informed. The GPRS service node SGSN now initiates in the mobile services switching center MSC/VLR1 to be informed the location update by means of the location update request LAUR. The subsequent steps up to and including the temporary mobile subscriber identity reallocation message TMSIRC are not relevant to the invention and are, therefore, not explained in more detail.

In respect of this solution, the following devices are used:

A device being installed within a GPRS service node comprising means for allocating a signaling address of a circuit switched mobile services switching center/visitor location register of a GSM network via an information message which exactly identifies one or more equipment. The device identifies in the GPRS offering service node, SGSN, by means of the frame relay channel used by the base station subsystem BSS. The means used for determining the signaling address may consist in an allocation table or a sorting tree, which allocate the signaling address to the identified frame forwarding channel.

Alternatively, also the base station subsystem can first be determined based on the knowledge of the frame relay channel by means of a sorting tree or an allocation table. The signaling address is thereupon determined by means of the identified base station subsystem. For this purpose a device being installed in a GPRS offering service node is used, with means for allocating the signaling address to the information as to which base station subsystem is commonly used by both services. Said means may be an allocation table or a sorting tree, which allocate a signaling address to the identified base station subsystem BSS.

FIG. 3 illustrates an application of a terminal equipment up to the determination of the signaling address of a mobile services switching center to be informed. A terminal equipment MS sends, via a base station subsystem BSS, one or more messages to a mobile services switching center SGSN of a packet switched service. A message AM1 containing information on the terminal equipment MS is thereby sent from the base station subsystem to the mobile services switching center SGSN. The base station subsystem forwards said information via a frame relay channel NSVC reserved for this base station subsystem. By using said channel, the base station subsystem is exactly identified. By using said identification, the mobile services switching center SGSN determines the signaling address of a mobile services switching center of the circuit switched service to be informed. For this purpose, it sends the identification in the form of an inquiry IM to a device based allocation table Inf2SigAddr. The device based allocation table Inf2SigAddr delivers the sought for signaling address in a response SM.

In an embodiment of the invention for a UMTS offering communication system, the process takes place in a comparable manner. In said embodiment, a terminal equipment attaches to a mobile services switching center via a radio network controller. For the transmission from the radio network controller to the mobile services switching center a signaling channel according to the SCCP (Signaling Connection Control Part) protocol is used, which exactly identifies the radio network controller. A device comprising means for allocating the signaling address to an information, which exactly identifies one or more equipment, determines the sought for signaling address in the mobile services switching center. In said embodiment, a radio network controller is identified. The allocation means may, for instance, consist in an allocation table or a sorting tree, which allocate the signaling address to the information as to which signaling channel is used.

What is claimed is:

1. Device for determining a signaling address of a mobile services switching center in a cellular communication system offering both circuit switched and packet switched services, the device installed in one or more service nodes, and comprising means for identifying one or more equipment of the communication system commonly used by the circuit switched and the packet switched services for reaching a certain terminal equipment on a transmission path, and means for determining the signaling address, which means determines the signaling address by means of an identification of the one or more equipment, wherein the equipment identified is the highest service node in the system hierarchy that is used by both the circuit switched and the packet switched services.

2. Device according to claim 1, wherein the one or more service nodes includes a GPRS offering service node and the mobile services switching center is a circuit switched mobile services switching center/visitor location register of a GSM network, further comprising means for allocating the signaling address of the circuit switched mobile services switching center/visitor location register of the GSM network to an information source exactly identifying the one or more equipment.

3. Device according to claim 2, wherein the equipment is a base station subsystem.

4. Device according to claim 2, being installed in a GPRS offering service node, wherein the one or more equipment includes a radio network controller, comprising means for allocating the signaling address via an information source, which radio network controller is commonly used by both services.

5. Device according to claim 1, wherein the one or more service nodes includes a GPRS offering service node and the mobile services switching center is a circuit switched mobile services switching center/visitor location register of a UMTS network, further comprising means for allocating the signaling address of the circuit switched mobile services switching center/visitor location register of the UMTS network via an information source exactly identifying the one or more equipment.

6. Device according to claim 1, wherein the means for identifying one or more equipment of the communication system includes a channel dedicated to the one or more equipment.

7. Method in a cellular communication system, comprising at least one mobile services switching center for providing a circuit switched service and at least one mobile services switching center for providing a packet switched service, for determining a signaling address of a mobile services switching center offering one of both services, comprising the following steps:

identifying one or more equipment of the communication system being used by both the circuit switched and the packet switched services, to reach a certain terminal equipment on a transmission path, and determining the signaling address by using an identification of the one or more equipment, wherein the equipment identified is the highest service node in the system hierarchy that is used by both the circuit switched and the packet switched services.

8. Method according to claim 7, wherein the determination of the signaling address is implemented in the mobile services switching center offering the other one of both services.

9. Method according to claim 8, wherein the at least one mobile services switching center for providing a circuit switched service is a circuit switched mobile services switching center/visitor location register of a UMTS (Universal Mobile Telecommunication System) network, and the at least one mobile services switching center for providing a packet switched service is a GPRS (General Packet Radio Service) offering service node, and wherein the signaling address of the circuit switched mobile services switching center/visitor location register of the Universal Mobile Telecommunication System network is determined by the General Packet Radio Service offering service node.

10. Method according to claim 8, wherein the at least one mobile services switching center for providing a circuit switched service is a circuit switched mobile services switching center/visitor location register of a GSM (Global System for Mobile communication) network, and the at least one mobile services switching center for providing a packet switched service is a GPRS (General Packet Radio Service) offering service node, and wherein the signaling address of the circuit switched mobile services switching center/visitor location register of the Global System for Mobile communication network is determined by the General Packet Radio Service offering service node allocating a signaling address to an information source, which identifies one or more equipment.

11. Method according to claim 7, wherein the at least one mobile services switching center for providing a circuit switched service is a circuit switched mobile services switching center/visitor location register of a GSM (Global System for Mobile communication) network, and the at least one mobile services switching center for providing a packet switched service is a GPRS (General Packet Radio Service) offering service node, and wherein the signaling address of the circuit switched mobile services switching center/visitor location register of the GSM network is determined by the GPRS offering service node allocating a signaling address to an information source, which identifies the one or more equipment.

12. Method according to claim 11, wherein the equipment is a base station subsystem.

13. Method according to claim 7, wherein the at least one mobile services switching center for providing a circuit switched service is a circuit switched mobile services switching center/visitor location register of a UMTS (Universal Mobile Telecommunication System) network, and the at least one mobile services switching center for providing a packet switched service is a GPRS (General Packet Radio Service) offering service node, and wherein the signaling address of the circuit switched mobile services switching center/visitor location register of the UMTS network is determined by the GPRS offering service node.

14. Method according to claim 13, wherein the equipment is a radio network controller.

15. Method according to claim 7, wherein the at least one mobile services switching center for providing a circuit switched service is a circuit switched mobile services switching center/visitor location register of a GSM (Global System for Mobile communication) network, and the at least one mobile services switching center for providing a packet switched service is a GPRS (General Packet Radio Service) offering service node, and wherein the signaling address of the circuit switched mobile services switching center/visitor location register of the Global System for Mobile communication network is determined by the General Packet Radio Service offering service node allocating a signaling address to an information source, which identifies one or more equipment.

16. Method according to claim 7, wherein the step of identifying one or more equipment of the communication system includes using a dedicated channel to identify the one or more equipment.

* * * * *